(12) United States Patent
Wittkopp et al.

(10) Patent No.: US 7,674,202 B2
(45) Date of Patent: Mar. 9, 2010

(54) EIGHT SPEED TRANSMISSION

(75) Inventors: Scott H. Wittkopp, Ypsilanti, MI (US);
Madhusudan Raghavan, West Bloomfield, MI (US); James M. Hart, Belleville, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 368 days.

(21) Appl. No.: 11/757,074

(22) Filed: Jun. 1, 2007

(65) Prior Publication Data
US 2008/0300091 A1 Dec. 4, 2008

(51) Int. Cl.
*F16H 3/44* (2006.01)
(52) U.S. Cl. ........... 475/286; 475/330

(58) Field of Classification Search .......... 475/275, 475/276, 286, 330
See application file for complete search history.

(56) References Cited

U.S. PATENT DOCUMENTS

| 6,723,019 | B2 | 4/2004 | Lee | |
| 6,752,739 | B2* | 6/2004 | Bucknor et al. | 475/296 |
| 7,140,996 | B2* | 11/2006 | Tiesler et al. | 475/276 |
| 2005/0272554 | A1* | 12/2005 | Raghavan et al. | 475/286 |

* cited by examiner

*Primary Examiner*—David D Le

(57) ABSTRACT

An eight speed automatic transmission is provided having an input member, an output member, three planetary gear sets, a plurality of coupling members and a plurality of torque transmitting devices. Each of the planetary gear sets includes first, second and third members. The torque transmitting devices include three clutches and three brakes.

18 Claims, 2 Drawing Sheets

| GEAR STATE | GEAR RATIO | RATIO STEP | CLUTCHING ELEMENTS ||||||
|---|---|---|---|---|---|---|---|---|
| | | | 26 | 28 | 30 | 32 | 34 | 36 |
| REV | -2.895 | | | | X | | X | X |
| N | | -0.57 | | | O | | O | O |
| 1ST | 5.078 | | | X | | X | X | |
| 2ND | 2.183 | 2.33 | | X | | | X | X |
| 3RD | 1.473 | 1.48 | | X | | X | | X |
| 4TH | 1.183 | 1.25 | | X | X | | | X |
| 5TH | 1.000 | 1.18 | X | X | | | | X |
| 6TH | 0.845 | 1.18 | X | X | X | | | |
| 7TH | 0.757 | 1.12 | X | | X | | | X |
| 8TH | 0.600 | 1.26 | X | | | X | | X |

X = ON - ENGAGED CARRYING TORQUE
O = ON - ENGAGED NOT CARRYING TORQUE

FIG. 3

EIGHT SPEED TRANSMISSION

FIELD

The invention relates generally to a multiple speed transmission having a plurality of planetary gear sets and a plurality of torque transmitting devices and more particularly to an automatic transmission having eight forward speeds, three planetary gear sets and a plurality of torque transmitting devices.

BACKGROUND

The statements in this section merely provide background information related to the present disclosure and may or may not constitute prior art.

A typical multiple speed transmission uses a combination of friction clutches, planetary gear arrangements and fixed interconnections to achieve a plurality of gear ratios. The number and physical arrangement of the planetary gear sets, generally, are dictated by packaging, cost and desired speed ratios.

While current transmissions achieve their intended purpose, the need for new and improved transmission configurations which exhibit improved performance, especially from the standpoints of efficiency, responsiveness and smoothness and improved packaging, primarily reduced size and weight, is essentially constant. Accordingly, there is a need for an improved, cost-effective, compact multiple speed transmission.

SUMMARY

A transmission is provided having an input member, an output member, three planetary gear sets, a plurality of coupling members and a plurality of torque transmitting devices. Each of the planetary gear sets includes first, second and third members. The torque transmitting devices are, for example, clutches and brakes.

An embodiment of the transmission includes three planetary gear sets, three clutches and three brakes.

More specifically, the embodiment of the transmission includes one compound and two simple planetary gear sets, three clutches and three brakes.

It is thus an object of the present invention to provide a transmission having three planetary gear sets.

It is a further object of the present invention to provide a transmission having eight forward speeds and reverse.

It is a still further object of the present invention to provide a transmission having three planetary gear sets, a plurality of coupling members and a plurality of torque transmitting devices.

It is a still further object of the present invention to provide a transmission having three planetary gear sets, a plurality of coupling members and a plurality of clutches and brakes.

It is a still further object of the present invention to provide a transmission having one compound and two simple planetary gear sets, a plurality of coupling members, three clutches and three brakes.

Further objects, aspects and advantages of the present invention will become apparent by reference to the following description and appended drawings wherein like reference numbers refer to the same component, element or feature.

DRAWINGS

The drawings described herein are for illustration purposes only and are not intended to limit the scope of the present disclosure in any way;

FIG. 3 is a truth table presenting the state of engagement of the various torque transmitting clutches and brakes in each of the available forward and reverse speeds or gear ratios of the automatic transmission illustrated in FIGS. 1 and 2;

DETAILED DESCRIPTION

The following description is merely exemplary in nature and is not intended to limit the present disclosure, application, or uses.

At the outset, it should be appreciated that the automatic transmission of the present invention has an arrangement of permanent mechanical connections between the elements of the three planetary gear sets. More specifically, an input shaft is permanently coupled to a first component or element of a first planetary gear. An output shaft is permanently coupled to a third component or element of a third planetary gear set. A second component or element of the first planetary gear set is permanently coupled to a first component or element of a second planetary gear set. A second component or element of the second planetary gear set is permanently coupled to a first component or element of a third planetary gear set.

Figure 1:
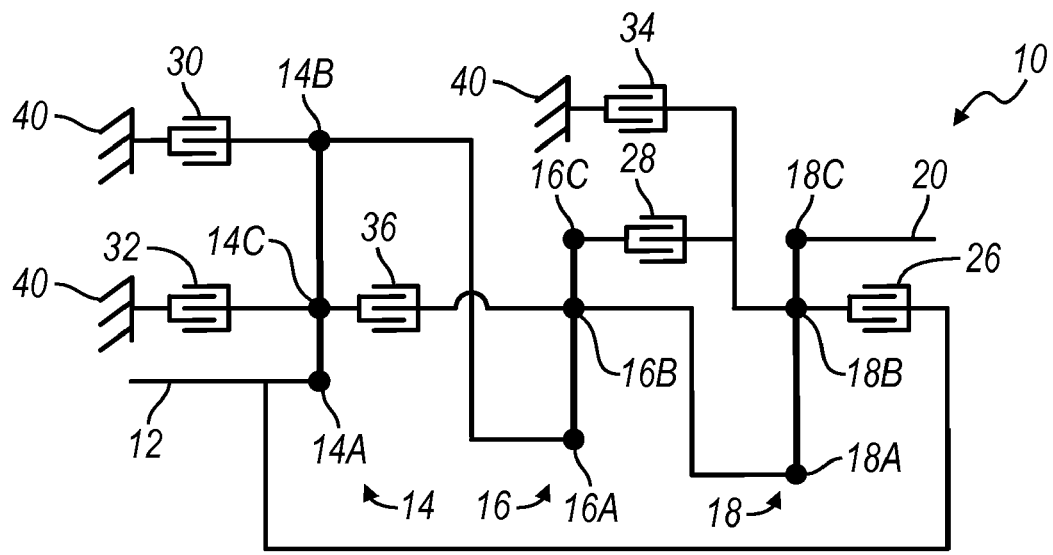
FIG. 1 is a lever diagram of an embodiment of an eight speed automatic transmission according to the present invention.

Referring now to FIG. 1, an embodiment of an eight speed automatic transmission 10 is illustrated in a lever diagram format. A lever diagram is a schematic representation of the components of a mechanical device such as an automatic transmission. Each individual lever represents a planetary gear set wherein the three basic mechanical components of the planetary gear are each represented by a node. Therefore, a single lever contains three nodes: one for the sun gear, one for the planet gear carrier, and one for the ring gear. The relative length between the nodes of each lever can be used to represent the ring-to-sun ratio of each respective gear set. These lever ratios, in turn, are used to vary the gear ratios of the transmission in order to achieve appropriate ratios and an appropriate ratio progression. Mechanical couplings or interconnections between the nodes of the various planetary gear sets are illustrated by thin, horizontal lines and torque transmitting devices such as clutches and brakes are presented as interleaved fingers. If the device is a brake, one set of the fingers is grounded. Further explanation of the format, purpose and use of lever diagrams can be found in SAE Paper 810102, "The Lever Analogy: A New Tool in Transmission Analysis" by Benford and Leising which is hereby fully incorporated by reference.

The transmission 10 includes an input shaft or member 12, a first planetary gear set 14 having three nodes: a first node 14A, a second node 14B and a third node 14C, a second planetary gear set 16 having three nodes: a first node 16A, a second node 16B and a third node 16C, a third planetary gear set 18 having three nodes: a first node 18A, a second node 18B and a third node 18C and an output shaft or member 20.

The first node 14A of the first planetary gear set 14 is coupled to the input shaft or member 12. The second node 14B of the first planetary gear set 14 is coupled to the first node 16A of the second planetary gear set 16. The second node 16B of the second planetary gear set 16 is coupled to first node 18A of the third planetary gear set 18. The output shaft or member 20 is coupled to the third node 18C of the third planetary gear set 18.

A first clutch 26 selectively connects the input shaft or member 12 to the second node 18B of the third planetary gear set 18. A second clutch 28 selectively connects the third node 16C of the second planetary gear set 16 to the second node 18B of the third planetary gear set 18. A third clutch 36 selectively connects the third node 14C of the first planetary gear set 14 to the second node 16B of the second planetary gear set 16. A first brake 30 selectively connects the second node 14B of the first planetary gear set 14 to ground or a transmission housing 40. A second brake 32 selectively connects the third node 14C of the first planetary gear set 14 to ground or the transmission housing 40. A third brake 34 selectively connects the second node 18B of the third planetary gear set 18 to ground or the transmission housing 40.

Figure 2:
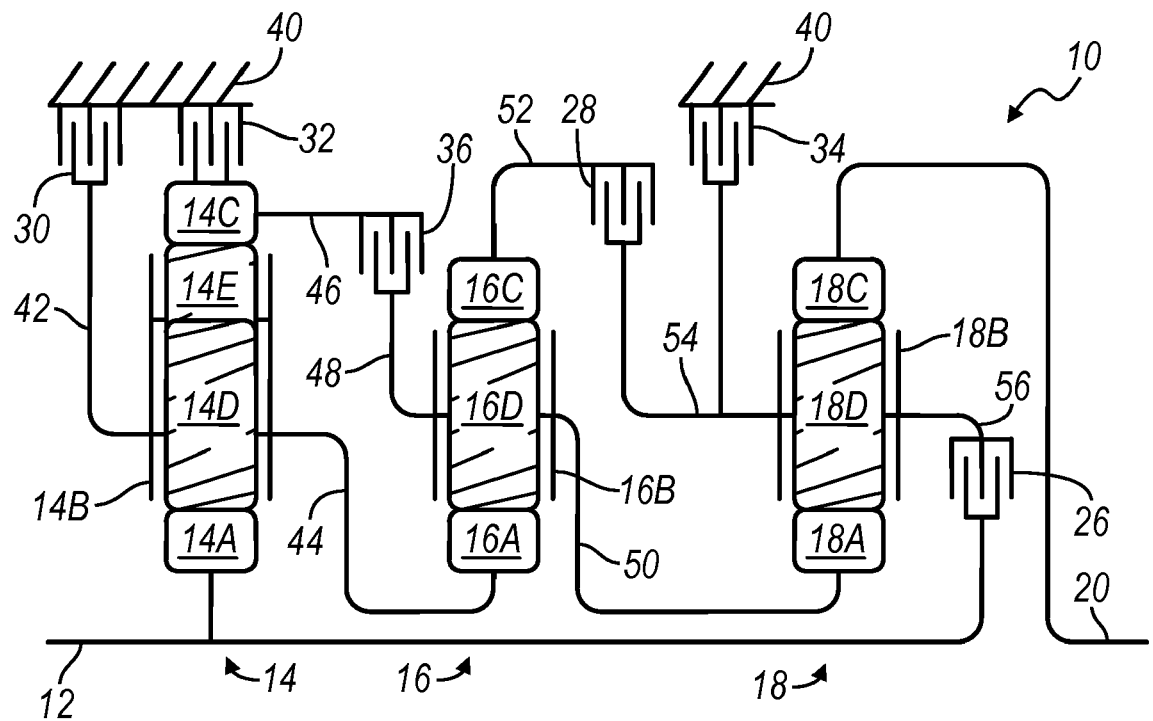
FIG. 2 is a diagrammatic view of an embodiment of an eight speed automatic transmission according to the present invention.

Referring now to FIG. 2, a stick diagram presents a schematic layout of the eight speed automatic transmission 10 according to the present invention. In FIG. 2, the numbering from the lever diagram of FIG. 1 is carried over. The clutches, brakes and couplings are correspondingly presented whereas the nodes of the planetary gear sets now appear as components of planetary gear sets such as sun gears, planet gear carriers and ring gears.

The input shaft or member 12 is continuously connected to and driven by a turbine of a torque converter (not shown) which, in turn, is driven by an engine (also not shown).

The first planetary gear set 14 is a compound planetary gear set that includes a first sun gear member 14A, a first planet gear carrier member 14B and a first ring gear member 14C. The first sun gear member 14A is connected to and driven by the input shaft or member 12 and is connected by the input shaft or member 12 to the first clutch 26. The first planet gear carrier member 14B rotatably supports a first plurality of planet gears 14D (only one pair of which is shown) and a second plurality of planet gears 14E (only one pair of which is shown). The first planet gear carrier member 14B is connected for common rotation with first and second intermediate shafts or members 42 and 44. The first plurality of planet gears 14D are configured to intermesh with the first sun gear member 14A and the second plurality of planet gears 14E. The second plurality of planet gears 14E are configured to intermesh with the first ring gear member 14C and the first plurality of planet gears 14D. The first ring gear member 14C is connected for common rotation with a third intermediate shaft or member 46.

The output shaft or member 20 is continuously connected with a final drive unit or transfer case (not shown).

The second planetary gear set 16 is a simple planetary gear set that includes a second sun gear member 16A, a second planet carrier member 16B that rotatably supports a second plurality of planet gears 16D and a second ring gear member 16C. The second plurality of planet gears 16D are configured to intermesh with both the second sun gear member 16A and the second ring gear member 16C. The second sun gear member 16A is connected for common rotation with the second intermediate shaft or member 44. The second planet carrier member 16B is connected for common rotation with a fourth intermediate shaft or member 48 and a fifth intermediate shaft or member 50. The second ring gear member 16C is connected for common rotation with a sixth intermediate shaft or member 52.

The third planetary gear set 18 is a simple planetary gear set that includes a third sun gear member 18A, a third planet carrier member 18B and a third ring gear 18C. The third sun gear member 18A is connected for common rotation with the fifth intermediate shaft or member 50. The third planet carrier member 18B rotatably supports a third plurality of planet gears 18D which are configured to intermesh with both the third sun gear member 18A and the third ring gear member 18C. The third planet carrier member 18B is connected for common rotation with a seventh intermediate shaft or member 54 and an eighth intermediate shaft or member 56. The third ring gear member 18C is connected for common rotation with the output shaft or member 20.

The torque-transmitting devices, namely, the clutches 26, 28 and 36 and the brakes 30, 32 and 34 achieve selective interconnection of the shafts or interconnecting members, members of the planetary gear sets and the housing. For example, the first clutch 26 is selectively engageable to connect the input shaft or member 12 to the eighth intermediate shaft or member 56. The second clutch 28 is selectively engageable to connect the sixth intermediate shaft or member 52 to the seventh intermediate shaft or member 54. Third clutch 36 is selectively engageable to connect the third intermediate shaft or member 46 to the fourth intermediate shaft or member 48. The first brake 30 is selectively engageable to connect the first planet carrier member 14B of the first planetary gear set 14 through the first intermediate shaft or member 42 to the transmission housing 40 to restrict rotation thereof relative to the housing 40. The second brake 32 is selectively engageable to connect the first ring gear member 14C of the first planetary gear set 14 to the transmission housing 40 to restrict rotation thereof relative to the housing 40. The third brake 34 is selectively engageable to connect the third planet carrier member 18B of the third planetary gear set 18 through the seventh intermediate shaft or member 54 to the transmission housing 40 to restrict rotation thereof relative to the housing 40.

Referring now to FIGS. 2 and 3, the operation of the embodiment of the eight speed automatic transmission 10 will be described. It will be appreciated that the automatic transmission 10 is capable of transmitting torque from the input shaft or member 12 to the output shaft or member 20 in at least eight forward speed or torque ratios and at least one reverse speed or torque ratio. Each forward and reverse speed or torque ratio is attained by engagement of a combination of three of the torque-transmitting devices, i.e., the first clutch 26, the second clutch 28, the third clutch 36, the first brake 30, the second brake 32 and the third brake 34, as will be explained below. FIG. 3 is a truth table presenting the various combinations of torque-transmitting devices that are activated or engaged to achieve the various gear states. Actual numerical gear ratios of the various gear states are also presented although it should be appreciated that these numerical values are exemplary only and that they may be adjusted over significant ranges to accommodate various applications and operational criteria of the transmission 10. An example of the gear ratios that may be obtained using the embodiments of the present invention are also shown in FIG. 3. Of course, other gear ratios are achievable depending on the gear diameter, gear teeth count and gear configuration selected.

To establish reverse gear, the first brake 30, the third brake 34 and the third clutch 36 are engaged or activated. The first brake 30 grounds the first planet carrier member 14B of the first planetary gear set 14 through the first intermediate shaft or member 42 to the transmission housing 40 to restrict rotation thereof relative to the housing 40. The third brake 34 grounds the third planet carrier member 18B of the third planetary gear set 18 through the seventh intermediate shaft or member 54 to restrict rotation thereof relative to the transmission housing 40. The third clutch 36 interconnects the third intermediate shaft or member 46 to the fourth intermediate shaft or member 48 thus connecting the first ring gear member 14C of the first planetary gear set 14 to the second planet carrier member 16B of the second planetary gear set 16 and, through the fifth intermediate shaft or member 50, the third sun gear 18A of the third planetary gear set 18.

Likewise, the eight forward gear ratios and neutral are achieved through different combinations of clutch and brake engagement, as shown in FIG. 3 wherein an "X" indicates that a clutch or brake is engaged or activated and an "O" indicates that a clutch or brake is engaged or activated but that it is not carrying torque.

It will be appreciated that the foregoing explanation of operation and gear states of the eight speed automatic transmission 10 assumes, first of all, that all the clutches and the brakes not specifically referenced in a given gear state are inactive or disengaged and, second of all, that during gear shifts, i.e., changes of gear state, between at least adjacent gear states, a clutch or brake engaged or activated in both gear states will remain engaged or activated.

The description of the invention is merely exemplary in nature and variations that do not depart from the gist of the invention are intended to be within the scope of the invention. Such variations are not to be regarded as a departure from the spirit and scope of the invention.

We claim:

1. An eight speed automatic transmission comprising, in combination,
    first, second and third planetary gear sets each having first, second and third members,
    an input shaft coupled to said first member of said first planetary gear set,
    an output shaft coupled to said third member of said third planetary gear set,
    a first interconnecting member coupling said second member of said first planetary gear set with said first member of said second planetary gear set,
    a second interconnecting member coupling said second member of said second planetary gear set with said first member of said third planetary gear set,
    a first torque transmitting device selectively interconnecting said second member of said third planetary gear set with said input shaft,
    a second torque transmitting device selectively interconnecting said third member of said second planetary gear set with said second member of said third planetary gear set,
    a third torque transmitting device selectively interconnecting said third member of said first planetary gear set with said second member of said second planetary gear set,
    a fourth torque transmitting device selectively interconnecting said second member of said first planetary gear set with a stationary member,
    a fifth torque transmitting device selectively interconnecting said third member of said first planetary gear set with said stationary member, and
    a sixth torque transmitting device selectively interconnecting said second member of said third planetary gear set with said stationary member,
    wherein said first member of said first planetary gear set is a sun gear, said second member of said first planetary gear set is a planet gear carrier and said third member of said first planetary gear set is a ring gear, and
    whereby said torque transmitting devices may be engaged in various combinations of three to establish at least eight forward speed ratios between said input shaft and said output shaft.

2. The automatic transmission of claim 1 wherein said first, second and third torque transmitting devices are clutches.

3. The automatic transmission of claim 1 wherein said fourth, fifth and sixth torque transmitting devices are brakes.

4. The automatic transmission of claim 1 wherein said stationary member is a housing.

5. The automatic transmission of claim 1 wherein said first member of said second planetary gear set is a sun gear, said second member of said second planetary gear set is a planet gear carrier and said third member of said second planetary gear set is a ring gear.

6. The automatic transmission of claim 1 wherein said first member of said third planetary gear set is a sun gear, said second member of said third planetary gear set is a planet gear carrier and said third member of said third planetary gear set is a ring gear.

7. The automatic transmission of claim 1 wherein said first planetary gear set is compound and said second and third planetary gear sets are simple.

8. An eight speed automatic transmission comprising, in combination,
    first, second and third planetary gear sets each having first, second and third members,
    an input shaft coupled to said first member of said first planetary gear set,
    an output shaft coupled to said third member of said third planetary gear set,
    a first interconnecting member coupling said second member of said first planetary gear set with said first member of said second planetary gear set,
    a second interconnecting member coupling said second member of said second planetary gear set with said first member of said third planetary gear set,
    a first clutch selectively interconnecting said second member of said third planetary gear set with said input shaft,
    a second clutch selectively interconnecting said third member of said second planetary gear set with said second member of said third planetary gear set,
    a third clutch selectively interconnecting said third member of said first planetary gear set with said second member of said second planetary gear set,
    a first brake selectively interconnecting said second member of said first planetary gear set with a stationary member,
    a second brake selectively interconnecting said third member of said first planetary gear set with said stationary member, and
    a third brake selectively interconnecting said second member of said third planetary gear set with said stationary member,
    wherein said first member of said first planetary gear set is a sun gear, said second member of said first planetary gear set is a planet gear carrier and said third member of said first planetary gear set is a ring gear, and
    whereby said clutches and brakes may be engaged in various combinations of three to establish at least eight forward speed ratios between said input shaft and said output shaft.

9. The automatic transmission of claim 8 wherein said clutches and brakes may also be engaged to establish one reverse speed ratio.

10. The automatic transmission of claim 8 wherein said first planetary gear set is compound and said second and third planetary gear sets are simple.

11. The automatic transmission of claim 8 wherein said stationary member is a housing.

12. The automatic transmission of claim 8 wherein said first member of said second planetary gear set is a sun gear, said second member of said second planetary gear set is a planet gear carrier and said third member of said second planetary gear set is a ring gear.

13. The automatic transmission of claim 8 wherein said first member of said third planetary gear set is a sun gear, said second member of said third planetary gear set is a planet gear carrier and said third member of said third planetary gear set is a ring gear.

14. An eight speed automatic transmission comprising, in combination,
- a first, compound planetary gear set, a second, simple planetary gear set and a third, simple planetary gear set each having first, second and third members,
- an input shaft coupled to said first member of said first, compound planetary gear set,
- an output shaft coupled to said third member of said third, simple planetary gear set,
- a first interconnecting member coupling said second member of said first, compound planetary gear set with said first member of said second, simple planetary gear set,
- a second interconnecting member coupling said second member of said second, simple planetary gear set with said first member of said third, simple planetary gear set,
- a first clutch selectively interconnecting said second member of said third, simple planetary gear set with said input shaft,
- a second clutch selectively interconnecting said third member of said second, simple planetary gear set with said second member of said third, simple planetary gear set,
- a third clutch selectively interconnecting said third member of said first, compound planetary gear set with said second member of said second, simple planetary gear set,
- a first brake selectively interconnecting said second member of said first, compound planetary gear set with a stationary member,
- a second brake selectively interconnecting said third member of said first, compound planetary gear set with said stationary member, and
- a third brake selectively interconnecting said second member of said third, simple planetary gear set with said stationary member.

15. The automatic transmission of claim 14 wherein said clutches and brakes may be engaged in various combinations of three to establish at least eight forward speed ratios and one reverse speed ratio between said input shaft and said output shaft.

16. The automatic transmission of claim 14 wherein said first member of said first, compound planetary gear set is a sun gear, said second member of said first, compound planetary gear set is a planet gear carrier and said third member of said first, compound planetary gear set is a ring gear.

17. The automatic transmission of claim 14 wherein said first member of said second, simple planetary gear set is a sun gear, said second member of said second, simple planetary gear set is a planet gear carrier and said third member of said second, simple planetary gear set is a ring gear.

18. The automatic transmission of claim 14 wherein said first member of said third, simple planetary gear set is a sun gear, said second member of said third, simple planetary gear set is a planet gear carrier and said third member of said third, simple planetary gear set is a ring gear.

* * * * *